(12) United States Patent
Zimmer

(10) Patent No.: US 7,257,856 B2
(45) Date of Patent: Aug. 21, 2007

(54) WINDSCREEN WIPER DEVICE, IN PARTICULAR FOR A MOTOR VEHICLE

(75) Inventor: Joachim Zimmer, Sasbach (DE)

(73) Assignee: Robert Bosch GmbH (DE)

( * ) Notice: Subject to any disclaimer, the term of this patent is extended or adjusted under 35 U.S.C. 154(b) by 633 days.

(21) Appl. No.: 10/470,676

(22) PCT Filed: Jul. 2, 2002

(86) PCT No.: PCT/DE02/02396

§ 371 (c)(1),
(2), (4) Date: Jul. 29, 2003

(87) PCT Pub. No.: WO03/047929

PCT Pub. Date: Jun. 12, 2003

(65) Prior Publication Data
US 2004/0111819 A1 Jun. 17, 2004

(30) Foreign Application Priority Data
Nov. 30, 2001 (DE) .................... 101 59 052

(51) Int. Cl.
B60S 1/18 (2006.01)
B60S 1/24 (2006.01)
(52) U.S. Cl. .................. 15/250.21; 15/250.23
(58) Field of Classification Search ............ 15/250.21, 15/250.23, 250.13, 250.3
See application file for complete search history.

(56) References Cited

U.S. PATENT DOCUMENTS

| 2,915,772 | A |   | 12/1959 | Ziegler |              |
|-----------|---|---|---------|---------|--------------|
| 4,707,876 | A | * | 11/1987 | Carducci | ......... 15/250.23 |
| 5,369,837 | A | * | 12/1994 | Chevroulet | ......... 15/250.21 |

FOREIGN PATENT DOCUMENTS

| DE | 37 33 620 |   | 4/1989 |
|----|-----------|---|--------|
| DE | 42 29 992 |   | 3/1993 |
| EP | 0 148 420 |   | 7/1985 |
| EP | 0406096   | * | 1/1991 |
| EP | 0537059   | * | 4/1993 |
| JP | 58-159073 |   | 9/1983 |
| JP | 10-258707 |   | 9/1998 |

* cited by examiner

*Primary Examiner*—Gary K. Graham
(74) *Attorney, Agent, or Firm*—Michael Best & Friedrich LLP

(57) ABSTRACT

A windscreen wiper device is shown, in particular for a motor vehicle, which features a wiper arm (18), which is able to support at least one wiper blade (22) and is fastened so that it can move in a rotating fashion at a minimum of one first coupling point (A) by means of a first crank (30) and at a second coupling point (B) that is different from the first coupling point (A) by means of a second crank (32). In addition, the cranks (30, 32) are linked at two fastening points that are different from the coupling points (A, B), whereby means (34) are provided to modify the distance between the two coupling points (A, B). In addition, a windscreen wiper device with a four-bar linkage is shown, whereby both cranks driving the wiper arm are causally driven.

17 Claims, 5 Drawing Sheets

Figure 1:
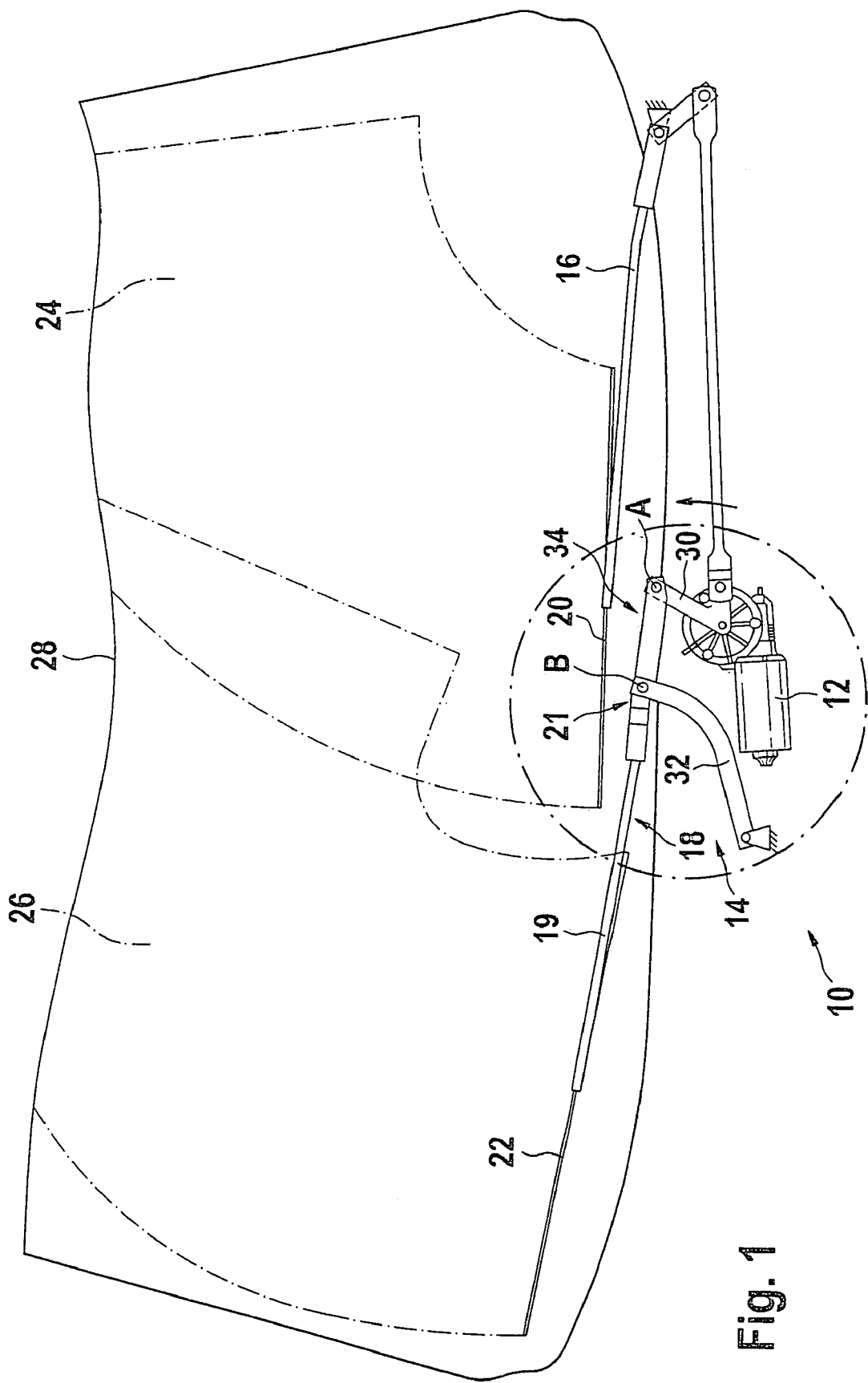

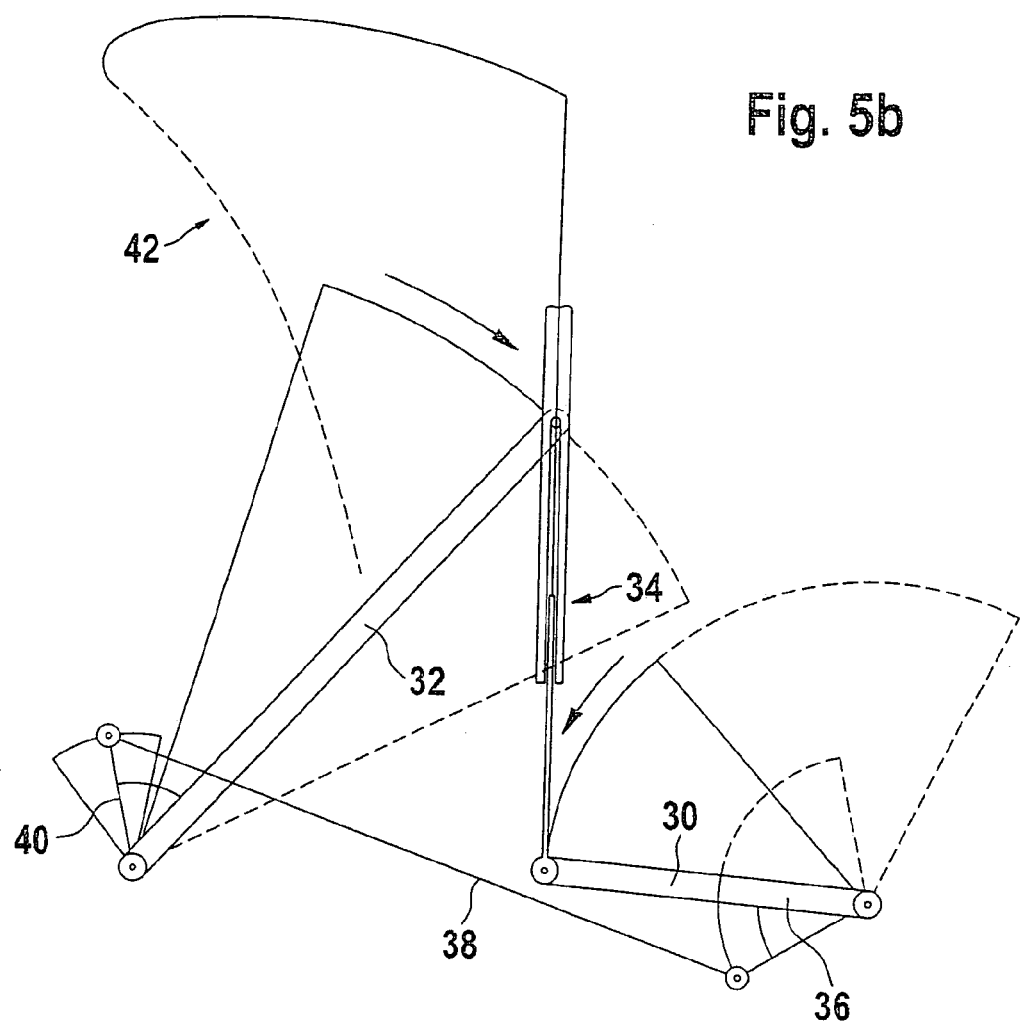
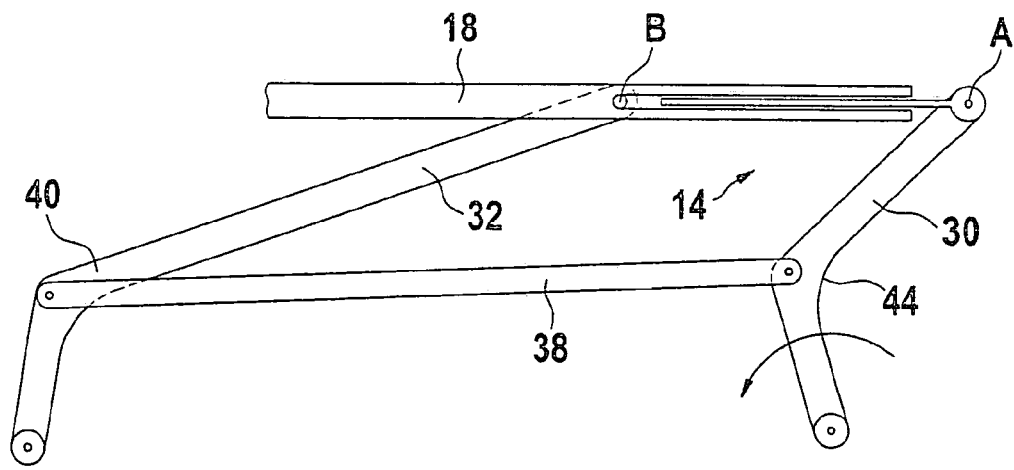

WINDSCREEN WIPER DEVICE, IN PARTICULAR FOR A MOTOR VEHICLE

STATE OF THE ART

The invention concerns a windscreen wiper device.

Numerous windscreen wiper devices with a four-bar linkage are known, for example from DE 44 44 066, which feature a wiper arm, which is held on two coupling points by two cranks and driven, thereby executing a stroke/rotating movement. These windscreen wiper devices feature a wiper arm, which is composed of an articulated part to which a wiper blade is linked. The articulated part is connected to a fastening part, which is fastened to the usual windscreen wiper device by means of two cranks. In this arrangement, one of the two cranks is driven causally in a pendulum or rotating fashion by a drive unit, thereby producing a rotating movement along a circular arc section for the wiper arm. In order to generate a stroke of the wiper arm, the second crank is fastened on the wiper device or on the vehicle body so that it can rotate, and is not driven, which is the reason why it is frequently designated as a guide crank since it takes the fastening part only one degree of freedom into the movement. The strokes in this process are very limited, which is disadvantageous in the case of large windows since the wiper arm can advance into the passenger-side corner of the windscreen in only a very limited way.

ADVANTAGES OF THE INVENTION

The windscreen wiper device of the invention has the advantage that greater strokes of the windscreen wiper arm can be generated and therefore improved vision can be achieved for the driver of the vehicle.

This is achieved by a wiper arm with a wiper blade being fastened so that it can move in a rotating fashion at a first coupling point by means of a first crank and at a second coupling point by means of a second crank and the cranks being linked at two different coupling points on the windscreen wiper device or the vehicle body. In this connection, the windscreen wiper device features means with which the distance between the two coupling points of the crank on the wiper arm can be modified during a wiping cycle.

It is especially advantageous if the distance between the coupling points can be modified as a function of the position of the wiper arm in order to adapt the wiper field of the windscreen wiper device optimally to requirements, in particular to be able to the adjust the stroke of the wiper arm in such a way that it can advance as far as possible into the upper passenger-side corner of the windscreen.

In this connection, it shall be viewed as especially advantageous if the means are embodied as a rectilinear sliding joint in order to guarantee low-noise and low-wear operation.

If both cranks are driven at least causally in a pendulum fashion, the stroke between the two coupling points does not have to be controlled separately. This is advantageous especially if both cranks are connected by means of a thrust rod and therefore the movement of the one, directly driven crank is transmitted to the second crank without having to use additional drive elements.

If at least one crank features a bend in the area in which the thrust rod is linked, the windscreen wiper device can be housed in the vehicle in a particularly space-saving manner since it requires only a little construction space beneath the windscreen wiper device of the vehicle.

Furthermore, it is advantageous if the wiper arm features an articulated part and a fastening part and the coupling points are arranged on the fastening part. In this way, the articulated part can be swung down from the fastening part as is generally common, thereby making it easier and quicker to change the wiper blade.

It is especially advantageous if in operation the wiper arm executes a rotational movement around a rotational axis and the rotational axis of the wiper arm is approximately perpendicular to the surface that is covered by the wiper arm/blade at a minimum of one, preferably at both coupling points.

The invention also provides a windscreen wiper device with a wiper arm, which is fastened so that it can move in a rotating fashion at a minimum of one first coupling point and at a second coupling point that is different from the first coupling point at a minimum of two cranks, whereby at least two cranks are casually shifted by a drive unit at least into a pendulum movement, advantageously features a low construction height without increasing costs as compared with a conventional windscreen wiper device. In addition, the surface being covered by the wiper blade can be better adjusted to the window as a result. Moreover, the development of noise from the gear of the windscreen wiper device can be reduced to a minimum.

It is especially advantageous in this connection if the two cranks are connected to one another via a thrust rod and feature a bend at which the thrust rod is linked.

DRAWINGS

An exemplary embodiment of the invention is depicted in the drawings and explained in greater detail in the following description. They show the following:

FIG. 1 A schematic representation of a windscreen wiper device with a four-bar linkage.

Figure 2:
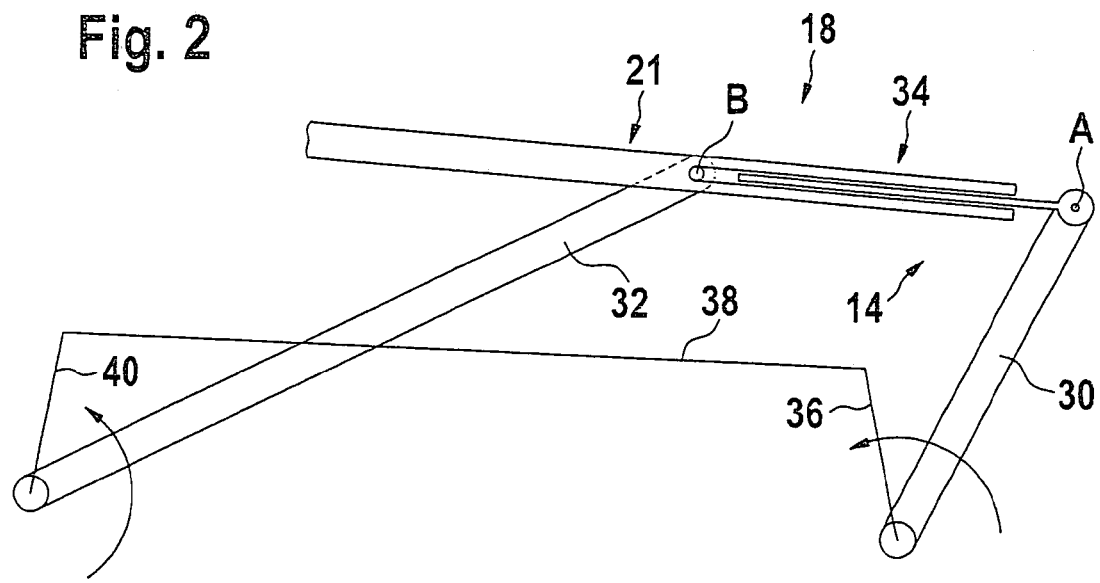

FIG. 2 A schematic representation of a four-bar linkage of a windscreen wiper device in accordance with the invention.

Figure 3:
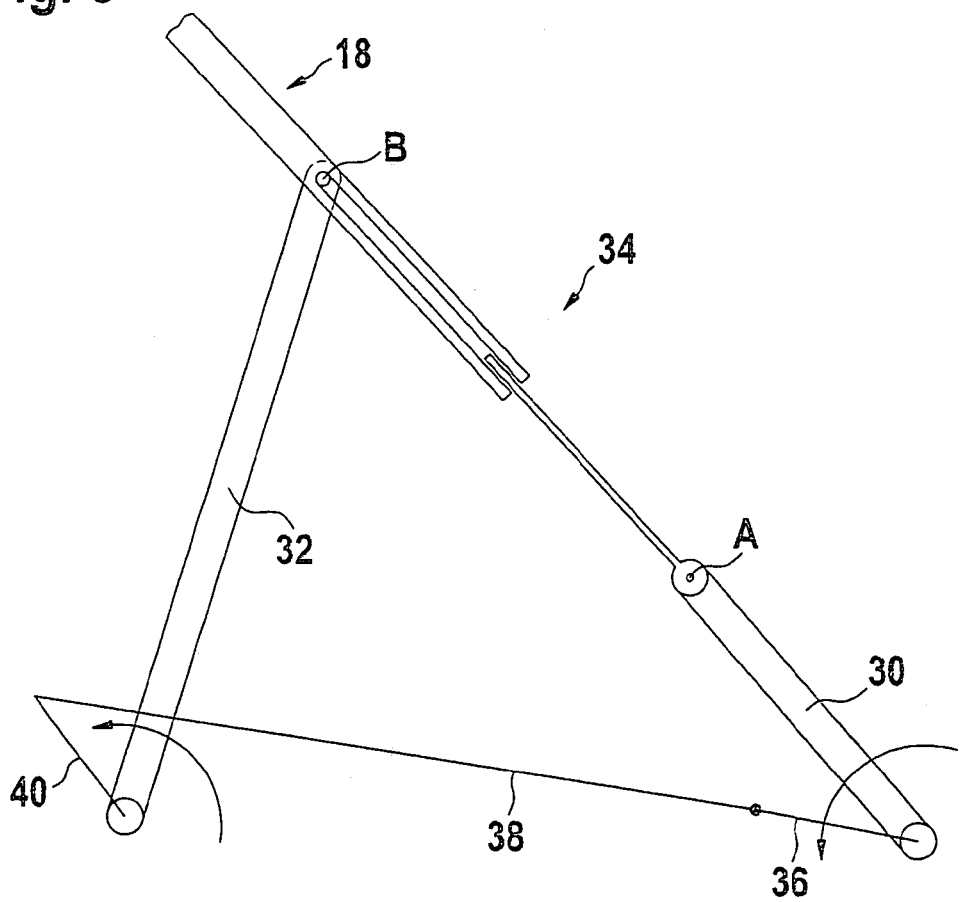

FIG. 3 The same windscreen wiper device as in FIG. 2, however, in the extended position with maximum stroke.

Figure 4:
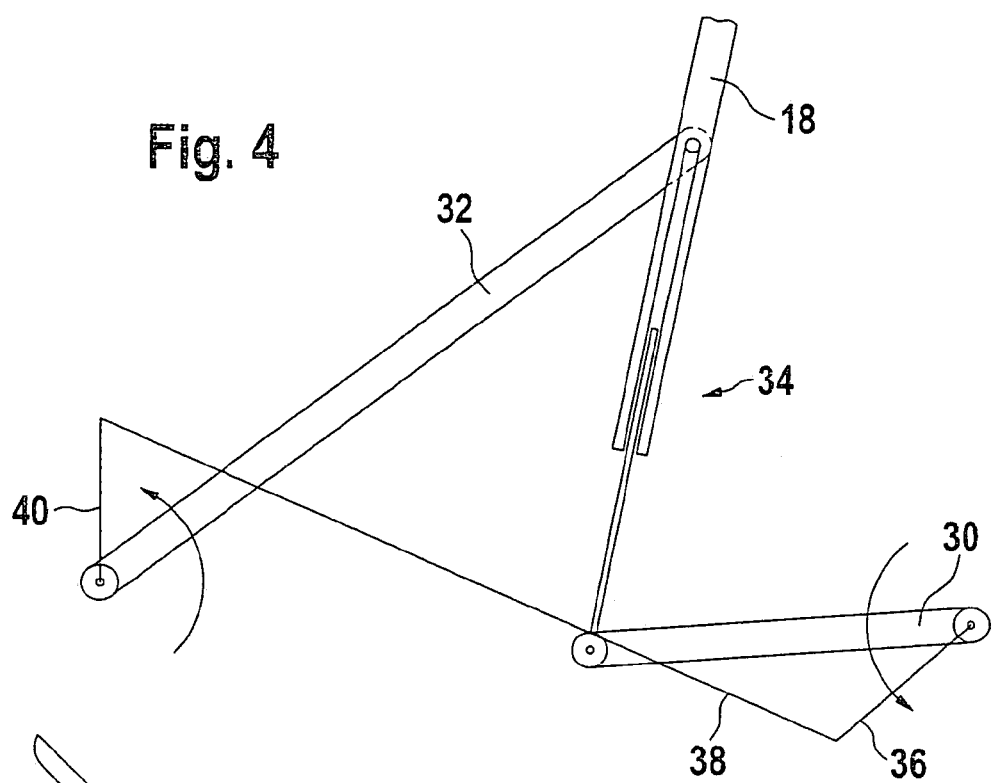

FIG. 4 Like in FIG. 3, but in the reverse position.

Figure 5A:
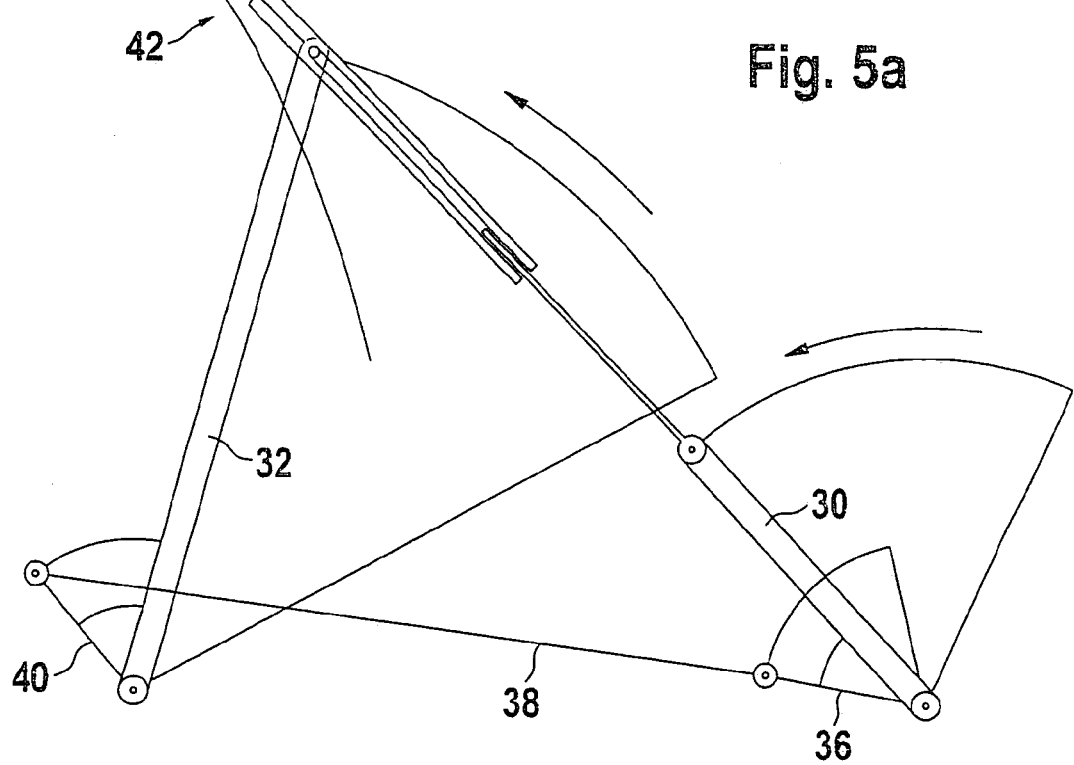

FIG. 5a The working range between the parked and extended positions of a windscreen wiper device in accordance with the invention in the same direction of rotation.

FIG. 5b The working range between the extended and reverse positions in the opposite direction of rotation.

FIG. 6 A four-bar linkage of a windscreen wiper device in accordance with the invention with a thrust bar and bend in a parked position.

Figure 7:
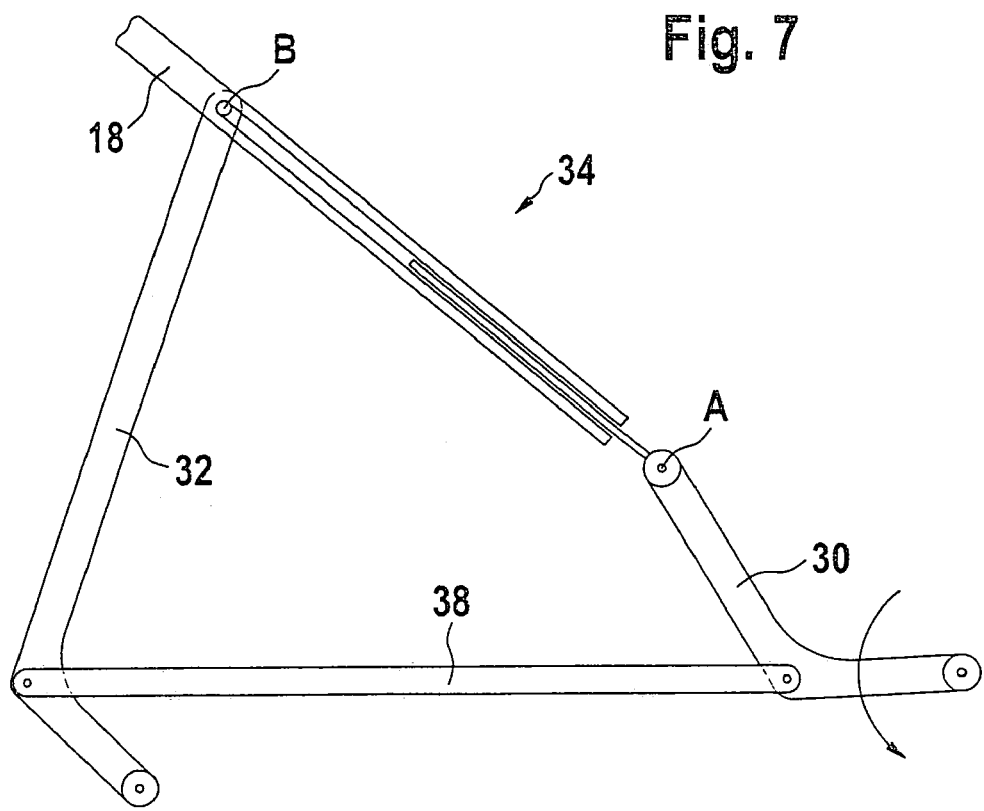

FIG. 7 A four-bar linkage of a windscreen wiper device in accordance with the invention with a bend in the extended position.

Figure 8:
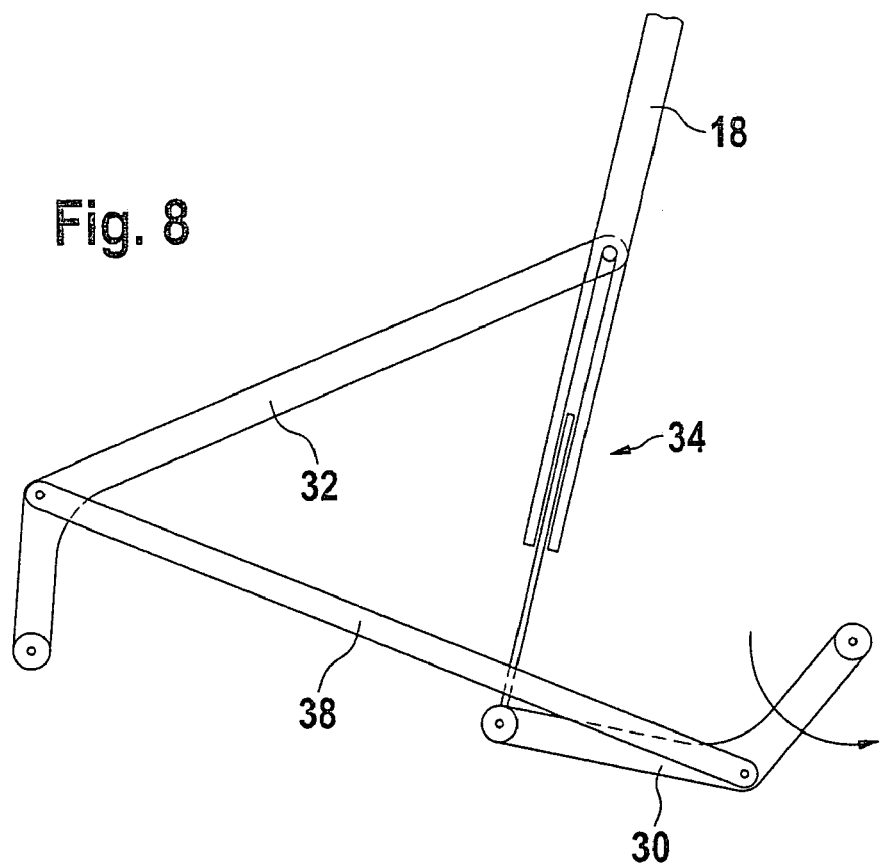

FIG. 8 The same device as in FIG. 7, but in the reverse position.

DESCRIPTION OF THE EXEMPLARY EMBODIMENTS

FIG. 1 shows a windscreen wiper device 10 in accordance with the invention with a four-bar linkage. It is comprised essentially of a drive unit 12, which is embodied as a reversing or rotating electric motor, a gear 14, which is embodied in the form of a four-bar linkage and the wiper arms 16, 18, which support the wiper blades 20, 22 and in operation wipe over a driver-side and passenger-side wiper surface 24, 26. In this arrangement, the wiper arm 18 on the passenger side is comprised essentially of an articulated part 19 that faces the wiper blade 22 and a fastening part 21.

The gear 14 features a first crank 30, which is directly driven causally by the drive unit 12 and is linked on the end of the fastening part 21 that faces away from the articulated part and a second crank 32, which is linked to a fixed point of the wiper device, on the one hand, and to a fastening part 21 of the passenger-side wiper arm 18, on the other. The first crank 30 is thus fastened so that it can move in a rotating fashion at the end of the wiper arm 18 facing away from the wiper blade at a first coupling point A and the second crank 32 at a second coupling point B that is different from the first coupling point A.

A schematic representation of the gear 14 of a windscreen wiper device 10 in accordance with the invention is shown in FIG. 2. The passenger-side wiper arm 18 features a rectilinear sliding joint 34, which is comprised of two elements that can be displaced linearly, on the end facing away from the wiper blade, i.e., on the fastening part 21. The first crank 30 is linked to one element and the second crank 32 to the other element of the rectilinear sliding joint 34 so that the distance between the coupling points A and B of the cranks 30, 32 can be modified.

Connected tightly to the first crank 30 is a first rectangular lever 36, which in operation moves along with the first crank 30 via the first crank's drive. Linked to this first rectangular lever 36 is a thrust rod 38, which moves a second rectangular lever 40 that is connected tightly to the second crank 32. Through this rectangular level the second crank 32 is moved causally in just the same way via the drive unit 12. The position of the gear 14 shown here corresponds to the parked position.

FIG. 3 shows the same arrangement as in FIG. 2, but in an extended position. In this case, the maximum stroke between the two elements of the rectilinear sliding joint 34 is achieved so that the two coupling points A, B have the greatest distance from one another in the cycle.

FIG. 4 shows the gear 14 in the reverse position. Here the rectilinear sliding joint 34 is partially telescoped so that the distance between the two coupling points A, B is greater than the minimum distance, but smaller than the maximum distance. In this reverse position, the movement of the passenger-side wiper arm 18 is just transitioning from the upward to the downward movement.

FIG. 5a shows the same device as in the preceding figures. The characteristic line 42 shows the movement of the wiper arm between the parked and the extended position, i.e., in the range during which the first crank 30 describes the same rotational direction as the second crank 32. FIG. 5b shows the subsequent working range between the extended position and the reverse position, i.e., precisely the area in which the second crank 32 has reversed its rotational direction vis-à-vis the first crank 30.

FIG. 6 depicts a variation of the gear 14 of a windscreen wiper device 10 in accordance with the invention. The first rectangular lever 36 and the second rectangular lever 40 are eliminated and the thrust rod 38 is linked directly to the cranks 30, 32.

To do this, the first crank 30 and the second crank 32 feature a first bend 44 and a second bend 46 on the coupling points of the thrust rod 38. The gear 14 is shown here in the parked position, which essentially corresponds to the lower, reverse position.

FIG. 7 shows the same gear as FIG. 6 in the extended position, in which the distance between the first coupling point A and the second coupling point B is at a maximum.

FIG. 8 again depicts the gear from FIG. 6, this time in the reverse position.

In principle, the most varied combinations of the features described here are possible, for example, the rectilinear sliding joint 34 can go beyond the second coupling point B in the direction of the wiper blade 22 so that the second coupling point B is arranged in the center of the longitudinal extension of the rectilinear sliding joint 34 for example. It is also possible to drive the two cranks 30, 32 causally each with the aid of a motor or to drive the second crank 32 via the first crank 30 with the aid of a gearwheel, chain gear or a cable gear instead of using the thrust rod 38. In another variation, the second crank 32 can also be provided without a drive, if the distance between the coupling points A and B are controlled, e.g., hydraulically or pneumatically, by the rectilinear sliding joint 34.

The invention claimed is:

1. Windscreen wiper device, in particular for a motor vehicle, with a wiper arm (18), which is able to support at least one wiper blade (22) and is fastened so that it can move in a rotating fashion at a minimum of one first coupling point (A) by means of a first crank (30) and at a second coupling point (B) that is different from the first coupling point (A) by means of a second crank (32), and in addition the cranks (30, 32) are linked at respective and different fastening points that are different from the coupling points (A, B), the fastening points being fixed relative to the vehicle, characterized in that means (34) are provided to modify the distance between the two coupling points (A, B).

2. Windscreen wiper device according to claim 1, characterized in that the distance between the two coupling points (A, B) can be modified as a function of the position of the wiper arm (18).

3. Windscreen wiper device according to claim 1, characterized in that the means (34) to modify the distance between the two coupling points include a rectilinear sliding joint.

4. Windscreen wiper device according claim 1, characterized in that both cranks (30, 32) are driven at least causally in a pendulum fashion.

5. Windscreen wiper device according to claim 1, characterized in that both cranks (30, 32) are connected at least indirectly by a thrust rod (38) for transmitting movement between the cranks.

6. Windscreen wiper device according to claim 5, characterized in that at least one crank (30, 32) features a bend (44, 46) in the area in which the thrust rod (38) is linked.

7. Windscreen wiper device according to claim 1, characterized in that the wiper arm (18) features an articulated part (19) and a fastening part (21) and the coupling points (A, B) are arranged on the fastening part (21).

8. Windscreen wiper device according to claim 1, characterized in that in operation the wiper arm (18) executes at least one partial rotational movement around a rotational axis and the rotational axis of the wiper arm (18) is essentially perpendicular to the surface that is covered by the wiper arm (18) in operation at a minimum of one, preferably at both coupling points (A, B).

9. Windscreen wiper device, in particular for a motor vehicle, with a wiper arm (18), which is able to support at least one wiper blade (22) and is fastened so that it can move in a rotating fashion at a minimum of one first coupling point (A) by means of a first crank (30) and at a second coupling point (B) that is different from the first coupling point (A) by means of a second crank (32), and in addition the cranks (30, 32) are linked at two fastening points that are different from the coupling points (A, B), characterized in that means (34) are provided to modify the distance between the two coupling points (A, B), characterized in that both cranks (30, 32) are connected at least indirectly by a thrust rod (38), and characterized in that at least one crank (30, 32) features a bend (44, 46) in the area in which the thrust rod (38) is linked.

10. Windscreen wiper device, in particular for a motor vehicle, with a wiper arm (18), which is able to support at least one wiper blade (22) and is fastened so that it can move in a rotating fashion at a minimum of one first coupling point (A) by means of a first crank (30) and at a second coupling point (B) that is different from the first coupling point (A) by means of a second crank (32), and in addition the first and second cranks (30, 32) are linked at respective first and second fastening points that are different from the coupling points (A, B), the first fastening point being spaced from the second crank and the second fastening point being spaced from the first crank, characterized in that means (34) are provided to modify the distance between the two coupling points (A, B).

11. Windscreen wiper device according to claim 10, characterized in that the distance between the two coupling points (A, B) can be modified as a function of the position of the wiper arm (18).

12. Windscreen wiper device according to claim 10, characterized in that the means (34) to modify the distance between the two coupling points include a rectilinear sliding joint.

13. Windscreen wiper device according claim 10, characterized in that both cranks (30, 32) are driven at least causally in a pendulum fashion.

14. Windscreen wiper device according to claim 10, characterized in that both cranks (30, 32) are connected at least indirectly by a thrust rod (38) for transmitting movement between the cranks.

15. Windscreen wiper device according to claim 14, characterized in that at least one crank (30, 32) features a bend (44, 46) in the area in which the thrust rod (38) is linked.

16. Windscreen wiper device according to claim 10, characterized in that the wiper arm (18) features an articulated part (19) and a fastening part (21) and the coupling points (A, B) are arranged on the fastening part (21).

17. Windscreen wiper device according to claim 10, characterized in that in operation the wiper arm (18) executes at least one partial rotational movement around a rotational axis and the rotational axis of the wiper arm (18) is essentially perpendicular to the surface that is covered by the wiper arm (18) in operation at a minimum of one, preferably at both coupling points (A, B).

* * * * *